(12) United States Patent
Tada

(10) Patent No.: US 12,187,078 B2
(45) Date of Patent: Jan. 7, 2025

(54) PNEUMATIC TIRE

(71) Applicant: Toyo Tire Corporation, Itami (JP)

(72) Inventor: Masaru Tada, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 73 days.

(21) Appl. No.: 18/078,266

(22) Filed: Dec. 9, 2022

(65) Prior Publication Data

US 2023/0202239 A1    Jun. 29, 2023

(30) Foreign Application Priority Data

Dec. 24, 2021  (JP) ................................. 2021-211495

(51) Int. Cl.
*B60C 11/12* (2006.01)
*B60C 11/03* (2006.01)

(52) U.S. Cl.
CPC ...... *B60C 11/0306* (2013.01); *B60C 11/0304* (2013.01); *B60C 11/1236* (2013.01); *B60C 11/1263* (2013.01); *B60C 2011/0346* (2013.01); *B60C 2011/0358* (2013.01); *B60C 2011/1268* (2013.01)

(58) Field of Classification Search
CPC ............... B60C 11/0304; B60C 11/032; B60C 11/1236; B60C 11/1263
See application file for complete search history.

(56) References Cited

U.S. PATENT DOCUMENTS

| | | | | |
|---|---|---|---|---|
| 4,763,708 | A | * | 8/1988 | Takahashi ................. B60C 3/06 152/209.8 |
| 2018/0281529 | A1 | * | 10/2018 | Hibino ................ B60C 11/1204 |
| 2019/0092100 | A1 | * | 3/2019 | Takata .................... B60C 11/03 |
| 2019/0255889 | A1 | * | 8/2019 | Taniguchi ........... B60C 11/0309 |

FOREIGN PATENT DOCUMENTS

| | | | | |
|---|---|---|---|---|
| JP | 2007223493 | A | * 9/2007 | ......... B60C 11/1281 |
| JP | 2013119350 | A | * 6/2013 | |
| JP | 2018-167718 | A | 11/2018 | |

OTHER PUBLICATIONS

English machine translation of JP2007223493 (Year: 2007).*

* cited by examiner

*Primary Examiner* — Robert C Dye
(74) *Attorney, Agent, or Firm* — WHDA, LLP

(57) ABSTRACT

A pneumatic tire including a first block line in which a plurality of first blocks sectioned by main grooves and lateral grooves are arranged in a tire circumferential direction on a tread, the plurality of lateral grooves includes first lateral grooves extending inclined with respect to a tire width direction and second lateral grooves inclined in an opposite direction to the first lateral grooves with respect to the tire width direction, the first and second lateral grooves are alternately arranged, the first block includes a first sipe extending while being inclined to the tire width direction, a second sipe inclined in an opposite direction to the first sipe with respect to the tire width direction, and a first connecting portion connecting ends of the first sipe and the second sipe, and the first connecting portion is formed by a recessed portion shallower than the first sipe and the second sipe.

6 Claims, 7 Drawing Sheets

[FIG. 1]
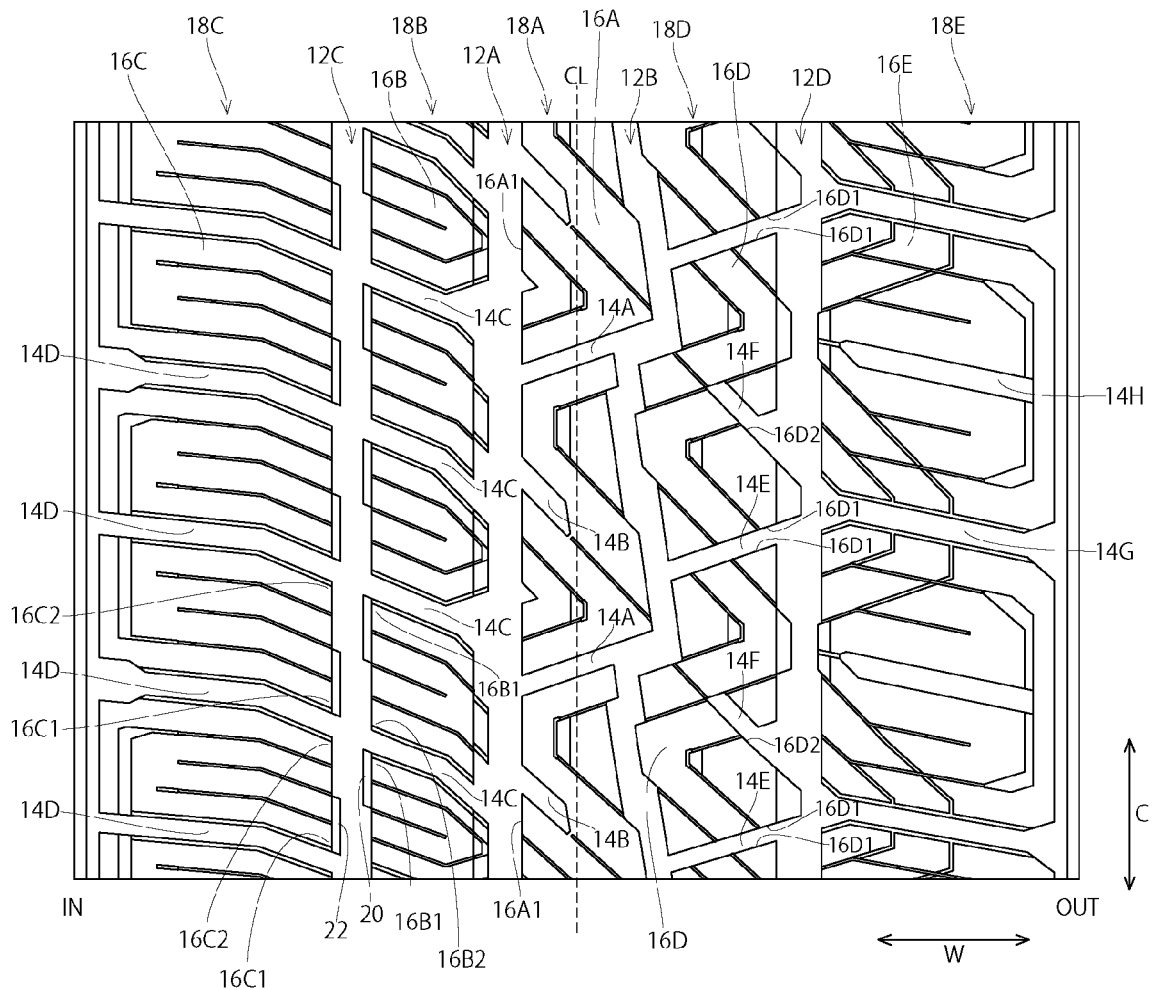

[FIG. 2]
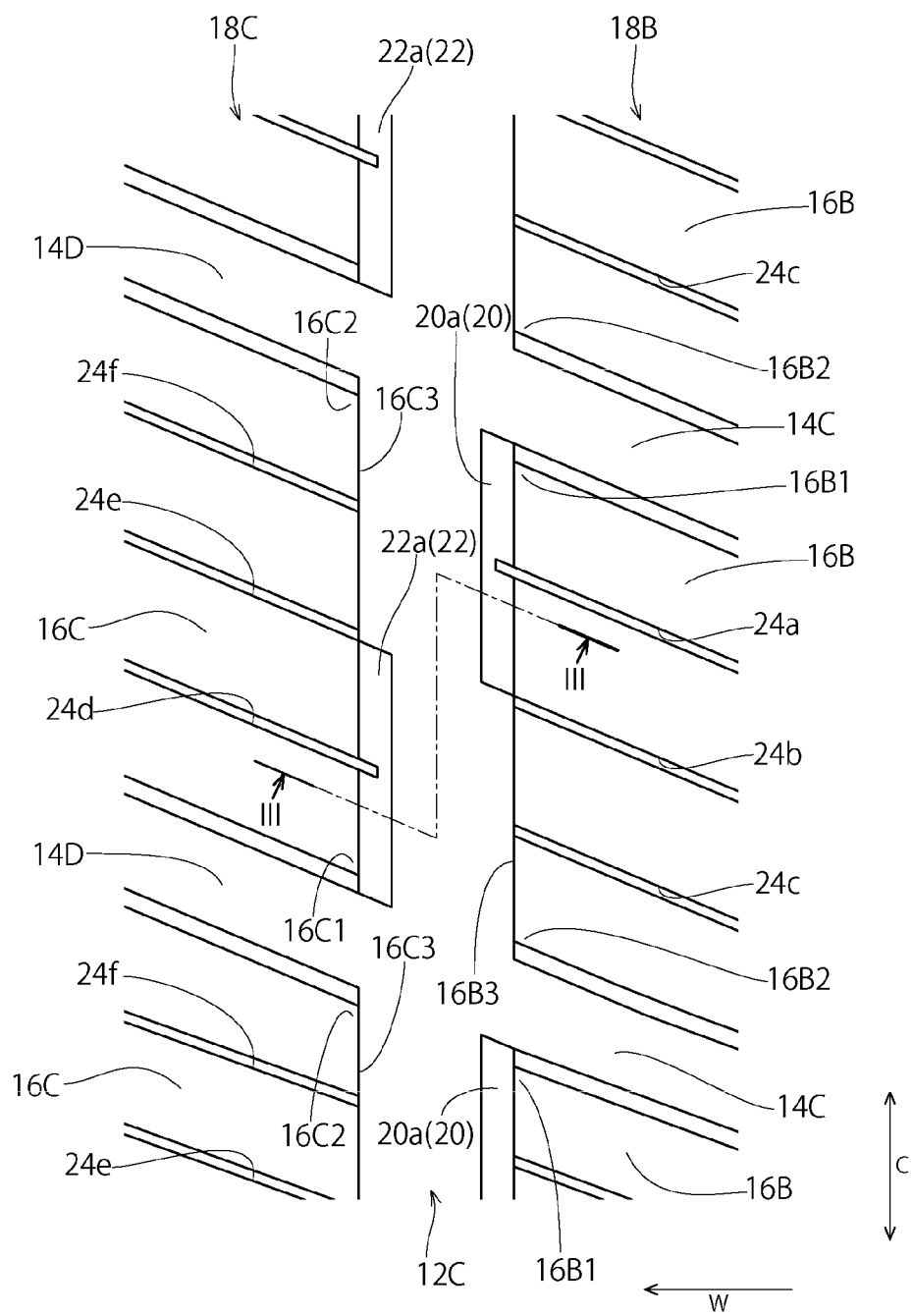

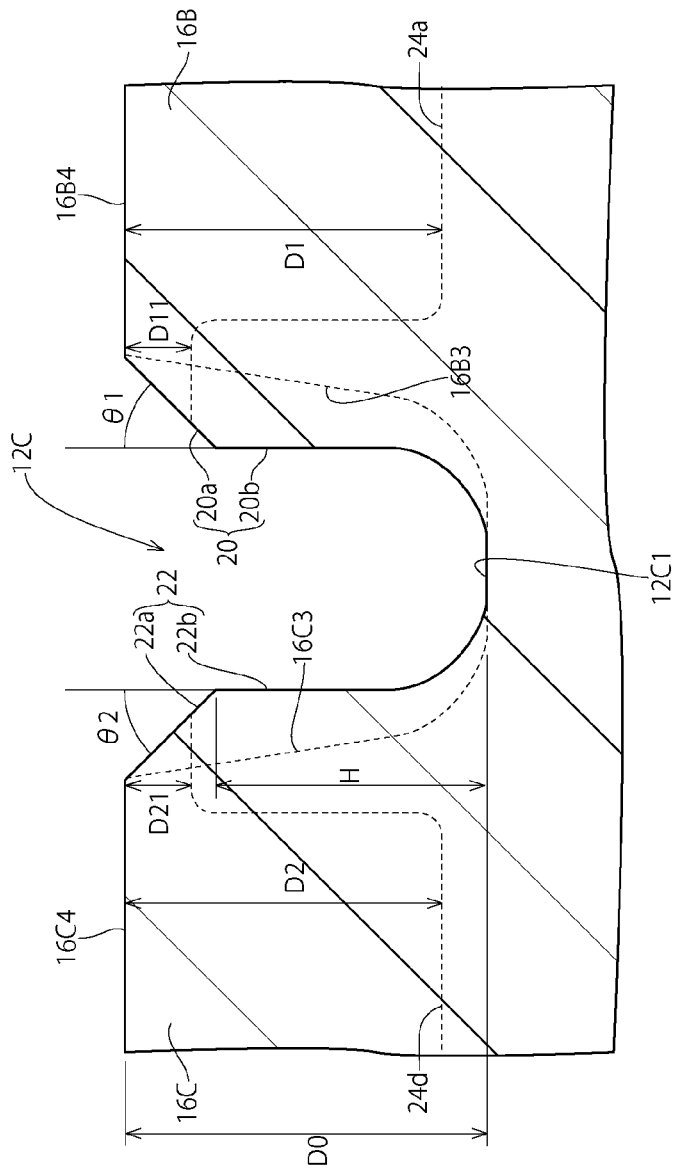
[FIG. 3]

[FIG. 4]
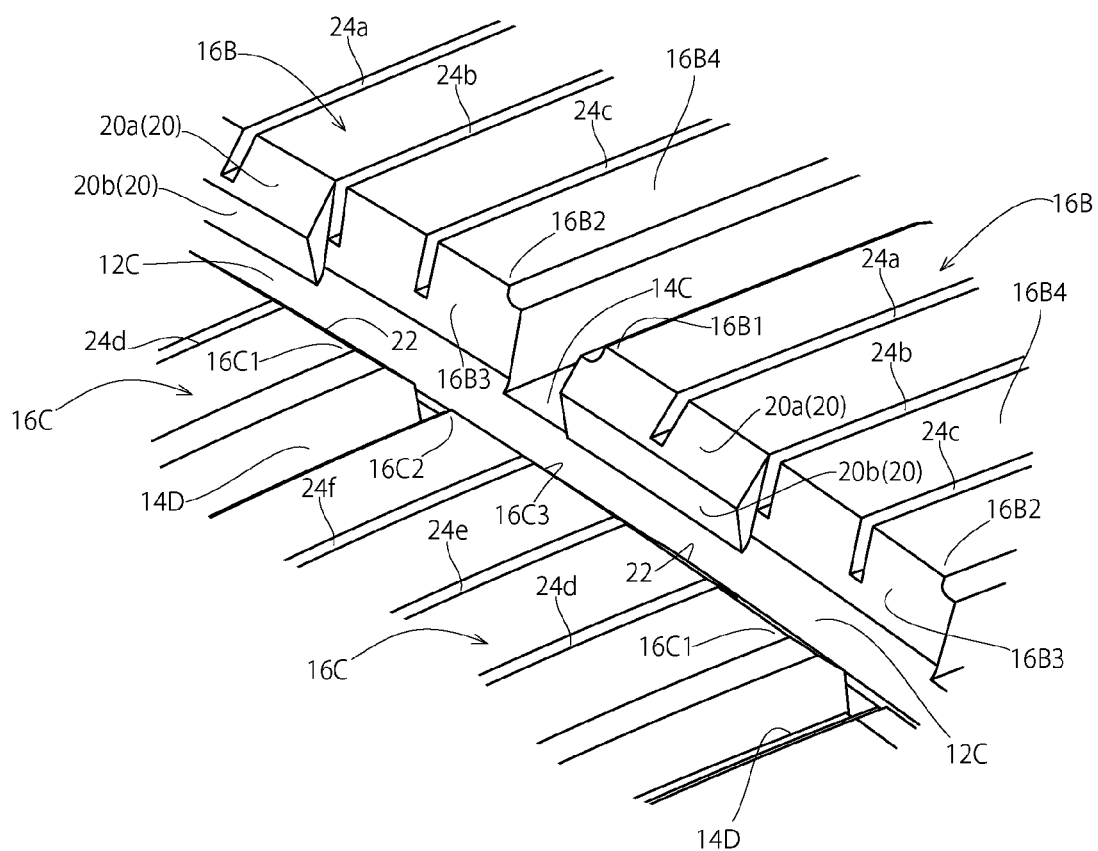

[FIG. 5]
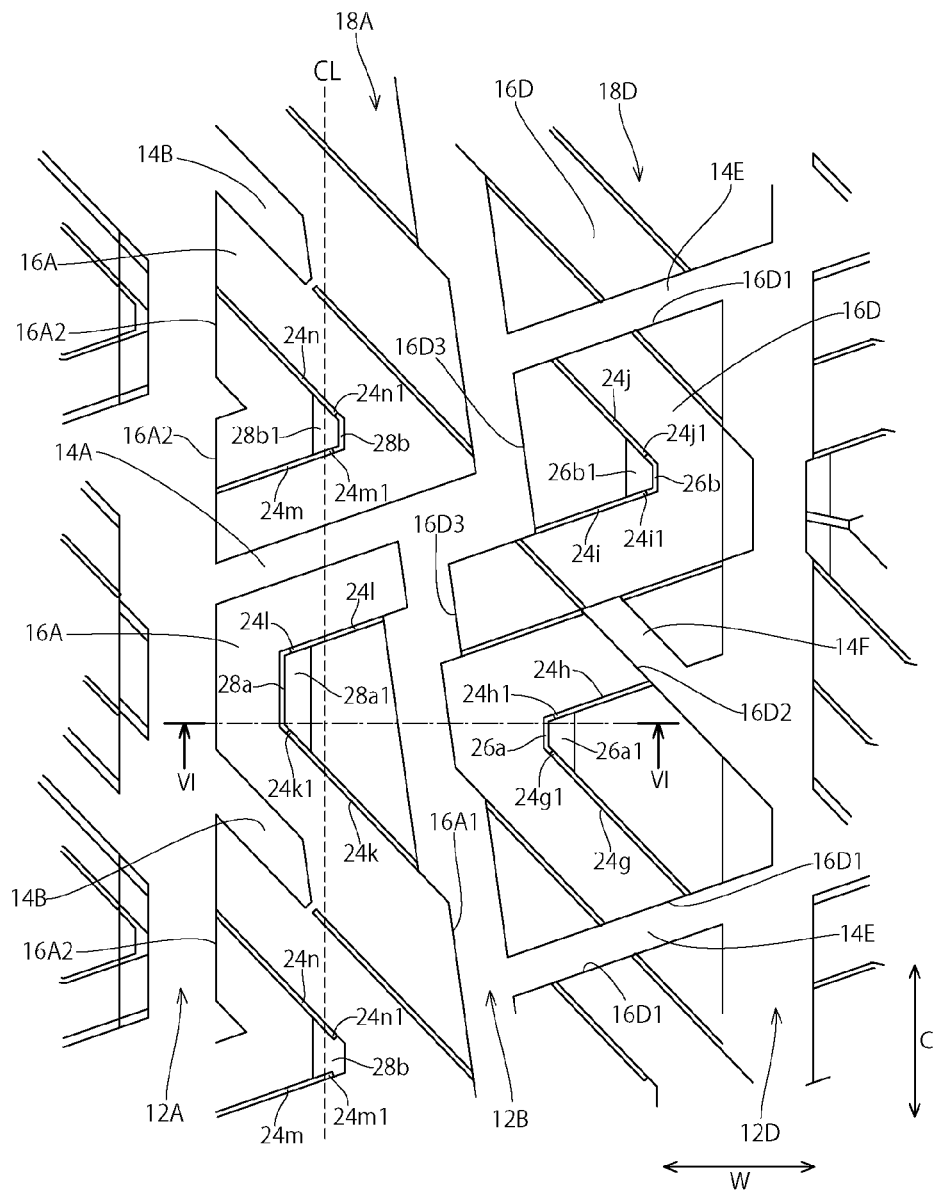

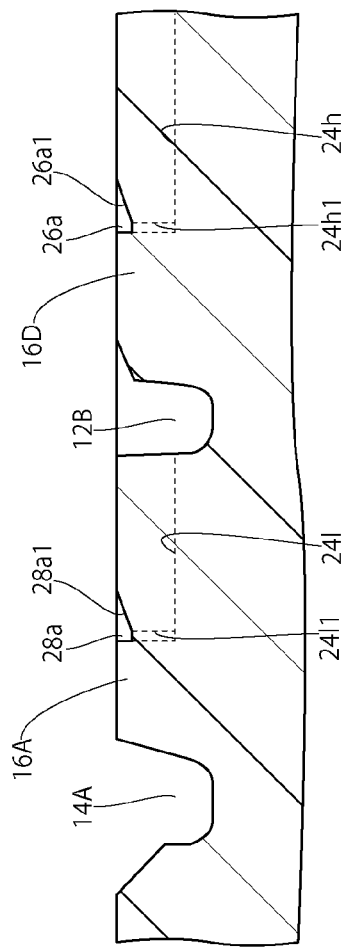
[FIG. 6]

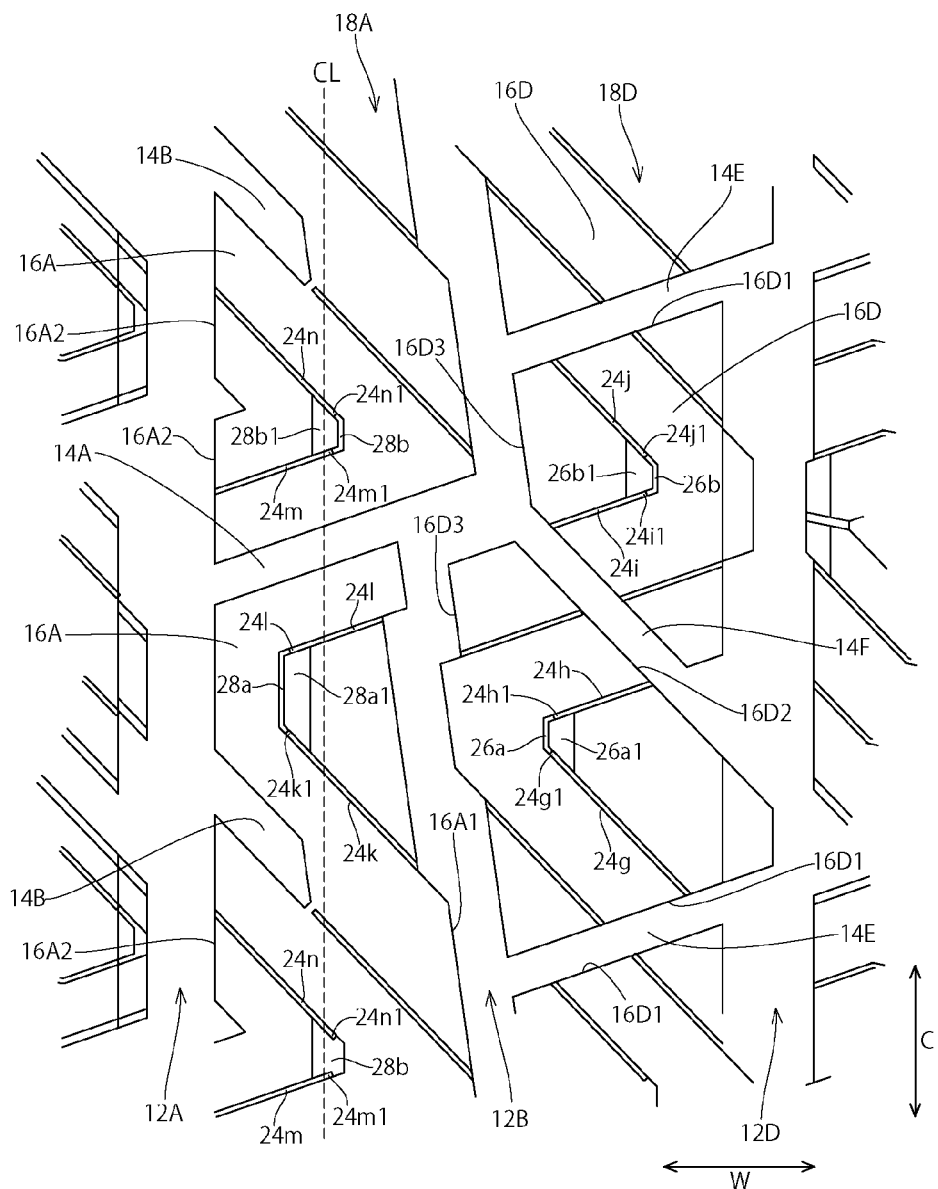
[FIG. 7]

PNEUMATIC TIRE

BACKGROUND OF THE INVENTION

1. Field of the Invention

The present invention relates to a pneumatic tire.

2. Description of Related Art

There exists a pneumatic tire provided with blocks formed by a main groove extending in a tire circumferential direction and lateral grooves extending in a tire width direction on a tread. The tire having the above blocks may be provided with V-shaped sipes extending from the main groove to the center in a width direction of each block, being curved in a tread surface of the block and extending to the main groove for exerting edge effect (for example, see JP2018-167718A). Here, edge effect is an effect of increasing gripping force by scratching a slippery road surface such as an icy and snowy road by corners on a land part formed by sipes or notches.

Since the above V-shaped sipe is formed by a continuous narrow groove, reduction in rigidity of the land part may cause deterioration of the uneven wear property.

SUMMARY OF THE INVENTION

An object of the invention is to provide a tire capable of improving wear resistance while maintaining edge effect.

According to an aspect of the invention, there is provided a pneumatic tire including a plurality of main grooves extending in a tire circumferential direction, a plurality of lateral grooves provided at intervals in the tire circumferential direction, and a first block line in which a plurality of first blocks sectioned by the main grooves and the lateral grooves are arranged in the tire circumferential direction on a tread, in which the plurality of lateral grooves include first lateral grooves extending while being inclined with respect to a tire width direction and second lateral grooves inclined in an opposite direction to the first lateral grooves with respect to the tire width direction, the first lateral grooves and the second lateral grooves are alternately arranged, the first block has a first sipe extending while being inclined with respect to the tire width direction, a second sipe inclined in an opposite direction to the first sipe with respect to the tire width direction, and a first connecting portion connecting ends of the first sipe and the second sipe, and the first connecting portion is formed by a recessed portion shallower than the first sipe and the second sipe.

Since the present invention has the above characteristics, it is possible to improve wear resistance while maintaining edge effect.

BRIEF DESCRIPTION OF THE DRAWINGS

FIG. 1 is a development view showing a tread pattern of a pneumatic tire according to an embodiment;

FIG. 2 is a main-part enlarged plan view of the tread pattern in FIG. 1;

FIG. 3 is a cross-sectional view taken along III-III line in FIG. 2; and

FIG. 4 is a main-part enlarged perspective view of the pneumatic tire according to the embodiment.

FIG. 5 is a main-part enlarged plan view of the tread pattern in FIG. 1;

FIG. 6 is a cross-sectional view taken along VI-VI line in FIG. 5; and

FIG. 7 is a main-part enlarged plan view of a tread pattern according to a modification example.

DESCRIPTION OF EMBODIMENTS

Hereinafter, an embodiment of the present invention will be explained with reference to the drawings.

A tire according to the embodiment is a pneumatic tire, which is provided with right and left pair of bead parts and sidewalls, and a tread provided between both sidewalls so as to connect outer end portions in a radial direction of the right and left sidewalls to each other. An internal configuration of the tire is not particularly limited, and the tire is formed by including, for example, annular bead cores embedded in beads, a radial-structured carcass ply extending in a toroidal shape between the pair of beads, a belt, a tread rubber, and the like provided on an outer side in the tire radial direction of the carcass ply on the tread. In the embodiment, a general tire structure can be adopted except for a tread pattern.

Respective shapes and dimensions in this description are measured in a normal state with no load in which the tire is fitted to a normal rim and a normal internal pressure is filled unless otherwise noted. The normal rim corresponds to the "standard rim" in the JATMA standard, "Design Rim" in the TRA standard, or "Measuring Rim" in the ETRTO standard. The normal internal pressure corresponds to the "maximum air pressure" in the JATMA standard, the "maximum value" described in "TIRE LOAD LIMITS AT VARIOUS COLD INFLATION PRESSURES" in the TRA standard, or "INFLATION PRESSURE" in the ETRTO standard.

(1) Basic Structure of Tread 10

FIG. 1 is a partial development view of a tread 10 of the tire according to the embodiment. In the drawing, a symbol CL denotes a tire equatorial plane corresponding to the center in the tire width direction. A symbol W denotes the tire width direction (also referred to as a tire axial direction). An inside in the tire width direction W indicates the side closer to the tire equatorial plane CL. An outside in the tire width direction W indicates the side farther from the tire equatorial plane CL. A symbol C denotes a tire circumferential direction which is a direction on a circumference centered at a tire rotation axis.

The tire shown in FIG. 1 is a tire in which front and back sides are designated when mounted to a vehicle. That is, a surface facing the outside and a surface facing the inside when mounted to the vehicle are designated. Accordingly, an indication for designating a mounting direction to the vehicle is provided on, for example, a sidewall surface of the tire. The tire is mounted to the vehicle so that a side denoted by a symbol OUT faces the outside (vehicle outside) in a vehicle mounted posture and a side denoted by a symbol IN faces the inside (vehicle inside) in the vehicle mounted posture in FIG. 1.

As shown in FIG. 1, four main grooves 12A, 12B, 12C, and 12D extending in a tire circumferential direction C, lateral grooves 14A, 14B, 14C, 14D, 14E, 14F, 14G, and 14H extending in the tire width direction W, and blocks 16A, 16B, 16C, 16D, and 16E are provided on the surface of the tread 10.

Specifically, a pair of center main grooves 12A, 12B and a pair of shoulder main grooves 12C, 12D are provided on the tread 10. The pair of center main grooves 12A, 12B are arranged on both sides of the tire equatorial plane CL. The pair of shoulder grooves 12C, 12D are respectively arranged on outer sides in the tire width direction of the pair of center main grooves 12A, 12B.

In the embodiment, the inside center main groove 12A in the vehicle inside IN, the inside shoulder main groove 12C in the vehicle inside IN, and the outside shoulder main groove 12D in the vehicle outside OUT extend in the tire circumferential direction C in an approximately straight shape, and the outside center main groove 12B in the vehicle outside OUT extends while bending zigzag in the tire circumferential direction C.

Note that the inside center main groove 12A, the inside shoulder main groove 12C, and the outside shoulder main groove 12D may be zigzag main grooves, and the outside center main groove 12B may be a straight-shaped main groove. That is, the main grooves 12A, 12B, 12C, and 12D do not always have to be parallel to the tire circumferential direction C as long as the grooves extend in the tire circumferential direction C and may be grooves extending in the tire circumferential direction C while being inclined.

A center block line 18A is provided between the inside center main groove 12A and the outside main groove 12B. The center block line 18A includes a plurality of center blocks 16A formed by being divided in the tire circumferential direction C by first center lateral grooves 14A. The first center lateral groove 14A is a groove extending while being inclined with respect to the tire width direction W and opening to the inside center main groove 12A and the outside center main groove 12B.

The center block 16A is provided with a second center lateral groove 14B which is inclined to the opposite direction of the first center lateral direction 14A. The second center lateral groove 14B is a groove in which one end opens to the inside center main groove 12A and the other side terminates in the center block 16A. The first center lateral grooves 14A and the second center lateral grooves 14B are alternately provided in the tire circumferential direction C. The first center lateral grooves 14A and the second center lateral grooves 14B may be straight-line grooves, curved-line grooves, or grooves each having a bending portion as long as the grooves extend while being inclined with respect to the tire width direction W.

An inside intermediate block line 18B is provided between the inside center main groove 12A and the inside shoulder main groove 12C. The inside intermediate block line 18B includes a plurality of inside intermediate blocks 16B formed by being divided in the tire circumferential direction C by inside intermediate lateral grooves 14C.

The inside intermediate lateral groove 14C is a groove extending while being inclined with respect to the tire width direction W and opening to the inside center main groove 12A and the inside shoulder main groove 12C. A plurality of inside intermediate lateral grooves 14C are provided at intervals in the tire circumferential direction C. The inside intermediate lateral grooves 14C are formed in a straight shape. The inside intermediate lateral grooves 14C may be straight-line grooves, curved-line grooves, or grooves each having a bending portion as long as the grooves extend while being inclined with respect to the tire width direction W.

Since the inside intermediate lateral grooves 14C extend while being inclined with respect to the tire width direction W, each of the inside intermediate blocks 16B has an acute angle portion 16B1 and an obtuse angle portion 16B2. The acute angle portion 16B1 is a corner portion formed by the inside intermediate lateral groove 14C crossing the inside shoulder main groove 12C at an acute angle. The obtuse angle portion 16B2 is a corner portion formed by the inside intermediate lateral groove 14C crossing the inside shoulder main groove 12C at an obtuse angle. The acute angle portions 16B1 and the obtuse angle portions 16B2 are alternately provided in the tire circumferential direction C.

An inside shoulder block line 18C is provided on an outer side in the tire width direction of the inside shoulder main groove 12C (namely, between the inside shoulder main groove 12C and a ground contact end). The inside shoulder block line 18C includes a plurality of inside shoulder blocks 16C formed by being divided in the tire circumferential direction C by inside shoulder lateral grooves 14D.

The inside shoulder lateral groove 14D is a groove extending while being inclined with respect to the tire width direction W and opening to the inside shoulder main groove 12C and the ground contact end. An opening of the inside shoulder lateral groove 14D opening to the inside shoulder main groove 12C is formed on an extended line of the inside intermediate lateral groove 14C. The inside shoulder lateral groove 14D is a groove having a bending portion. The inside shoulder lateral grooves 14D may be straight-line grooves, curved-line grooves, or grooves each having a bending portion as long as the grooves extend while being inclined with respect to the tire width direction W.

Since the inside shoulder lateral grooves 14D extend while being inclined with respect to the tire width direction W, each of the inside shoulder blocks 16C has an acute angle portion 16C1 and an obtuse angle portion 16C2. The acute angle portion 16C1 is a corner portion formed by the inside shoulder lateral groove 14D crossing the inside shoulder main groove 12C at an acute angle. The obtuse angle portion 16C2 is a corner portion formed by the inside shoulder lateral groove 14D crossing the inside shoulder main groove 12C at an obtuse angle.

The acute angle portions 16C1 and the obtuse angle portions 16C2 of the inside shoulder blocks 16C are alternately provided in the tire circumferential direction C in the same manner as the acute angle portions 16B1 and the obtuse angle portions 16B2 of the inside intermediate blocks 16B. The acute angle portion 16C1 of the inside shoulder block 16C faces the obtuse angle portion 16B2 of the inside intermediate block 16B in a direction in which the inside intermediate lateral groove 14C are extended. The obtuse angle portion 16C2 of the inside shoulder block 16C faces the acute angle portion 16B1 of the inside intermediate block 16B in a direction in which the inside intermediate lateral groove 14C are extended.

An outside intermediate block line 18D is provided between the outside center main groove 12B and the outside shoulder main groove 12D. The outside intermediate block line 18D includes a plurality of outside intermediate blocks 16D formed by being divided in the tire circumferential direction C by first outside intermediate lateral grooves 14E. The first outside intermediate lateral groove 14E is a groove extending while being inclined with respect to the tire width direction W and opening to the outside center main groove 12B and the outside shoulder main groove 12D.

The outside intermediate block 16D is provided with second outside intermediate lateral grooves 14F which is inclined to an opposite direction of the first outside intermediate lateral groove 14E. The second outside intermediate lateral groove 14F is a groove in which one end opens to the outside shoulder main groove 12D and the other end terminates in the outside intermediate block 16D. The first outside intermediate lateral grooves 14E and the second outside intermediate lateral grooves 14F are alternately provided in the tire circumferential direction C. The first outside intermediate lateral grooves 14E and the second outside intermediate lateral grooves 14F may be straight-line grooves, curved-line grooves, or grooves each having a bending portion as long as the grooves extend while being inclined with respect to the tire width direction W. The second outside intermediate lateral groove 14F may be a groove in which one end opens to the outside shoulder main groove 12D and the other end opens to the outside center main groove 12B as shown in FIG. 7.

An outside shoulder block line 18E is provided on an outer side in the tire width direction of the outside shoulder main groove 12D (namely, between the outside shoulder main groove 12D and a ground contact end). The outside shoulder block line 18E includes a plurality of outside shoulder blocks 16E formed by being divided in the tire circumferential direction C by the first outside shoulder lateral grooves 14G. The first outside shoulder lateral groove 14G is a groove extending while being inclined with respect to the tire width direction W and opening to the outside shoulder main groove 12D and the ground contact end.

The outside shoulder block 16E is provided with the second outside shoulder lateral groove 14H extending in parallel to the first outside shoulder lateral groove 14G. The second outside shoulder lateral groove 14H is a groove in which one end opens to the ground contact end and the other end terminates in the outside shoulder block 16E. The first outside shoulder lateral grooves 14G and the second outside shoulder lateral grooves 14H are alternately provided in the tire circumferential direction C. The first outside shoulder lateral grooves 14G and the second outside shoulder lateral grooves 14H may be straight-line grooves, curved-line grooves, or grooves each having a bending portion as long as the grooves extend while being inclined with respect to the tire width direction W.

(2) Inside Intermediate Block 16B and Inside Shoulder Block 16C

Next, the inside intermediate block 16B and the inside shoulder block 16C will be explained. As shown in FIG. 1 and FIG. 2, the inside intermediate block 16B and the inside shoulder block 16C are respectively provided with reinforcing protrusions 20, 22.

The reinforcing protrusion 20 protrudes from the acute angle portion side in a side wall 16B3 of the inside intermediate block 16B which faces the shoulder main groove 12C toward the center of the shoulder main groove 12C (toward a side wall 16C3 of the inside shoulder block 16C which faces the side wall 16B3). The reinforcing protrusion 20 is provided from a tread surface 16B4 of the inside intermediate block 16B toward a groove bottom 12C1 of the shoulder main groove 12C as shown in FIG. 3.

The reinforcing protrusion 20 includes a tread-surface side inclined surface 20a connected to the tread surface 16B4 of the inside intermediate block 16B and extending toward the groove bottom 12C1 side and a groove-bottom side inclined surface 20b connected to the tread-surface side inclined surface 20a and further extending toward the groove bottom 12C1 side as shown in FIG. 3.

The tread-surface side inclined surface 20a is inclined with respect to the tire radial direction. The groove-bottom side inclined surface 20b is provided approximately in parallel to the tire radial direction. That is, an inclination angle θ1 of the tread-surface side inclined surface 20a with respect to the tire radial direction is larger than an inclination angle of the groove-bottom side inclined surface 20b with respect to the tire radial direction. θ1 is, for example, 25 degrees or more and 65 degrees or less.

Note that the groove-bottom side inclined surface 20b may be inclined with respect to the tire radial direction as long as the inclination angle with respect to the tire radial direction is smaller than the inclination angle θ1 of the tread-surface side inclined surface 20a. The inclination angle of the groove-bottom side inclined surface 20b with respect to the tire radial direction can be 10 degrees or less.

At a place closer to the groove bottom 12C1 than the groove-bottom side inclined surface 20b, a curved surface smoothly connecting the groove-bottom side inclined surface 20b and the groove bottom 12C1 is provided.

The reinforcing protrusion 22 protrudes from the acute angle portion side in the side wall 16C3 of the inside shoulder block 16C which faces the shoulder main groove 12C toward the center of the inside shoulder main groove 12C (toward the side wall 16B3 of the inside intermediate block 16B). The reinforcing protrusion 22 is provided from a tread surface 16C4 of the inside shoulder block 16C toward the groove bottom 12C1 of the shoulder main groove 12C. The above reinforcing protrusions 22 and the reinforcing protrusions 20 provided in the inside intermediate blocks 16B are alternately arranged in the tire circumferential direction C (see FIG. 1 and FIG. 2).

The reinforcing protrusion 22 includes a tread-surface side inclined surface 22a connected to the tread surface 16C4 of the inside shoulder block 16C and extending toward the groove bottom 12C1 side and a groove-bottom side inclined surface 22b connected to the tread-surface side inclined surface 22a and further extending toward the groove bottom 12C1 side.

The tread-surface side inclined surface 22a is inclined with respect to the tire radial direction. The groove-bottom side inclined surface 22b is provided approximately in parallel to the tire radial direction. That is, an inclination angle θ2 of the tread-surface side inclined surface 22a with respect to the tire radial direction is larger than an inclination angle of the groove-bottom side inclined surface 22b with respect to the tire radial direction. θ2 is, for example, 25 degrees or more and 65 degrees or less.

Note that the groove-bottom side inclined surface 22b may be inclined with respect to the tire radial direction as long as the inclination angle with respect to the tire radial direction is smaller than the inclination angle θ2 of the tread-surface side inclined surface 22a. The inclination angle of the groove-bottom side inclined surface 22b with respect to the tire radial direction can be 10 degrees or less.

At a place closer to the groove bottom 12C1 from the groove-bottom side inclined surface 22b, a curved surface smoothly connecting the groove-bottom side inclined surface 22b and the groove bottom 12C1 is provided.

A height H of the groove-bottom side inclined surfaces 20b, 22b of the reinforcing protrusions 20, 22 from the groove bottom 12C1 of the inside shoulder main groove 12C is preferably 50% or more of a depth D0 of the inside shoulder main groove 12C. That is, it is preferable that the tread-surface side inclined surfaces 20a, 22a are provided closer to the tread surface side than a position of 50% of the depth D0 of the inside shoulder main groove 12C. For example, the depth D0 of the inside shoulder main groove 12C may be 5 to 10 cm, the height H of the groove-bottom side inclined surfaces 20b, 22b may be 5 to 8.5 cm, and a height of the tread-surface side inclined surfaces 20a, 22a (length in the tire radial direction) may be 1 to 3 cm.

Additionally, sipes may be provided on the inside intermediate blocks 16B and the inside shoulder blocks 16C. In the embodiment, three sipes 24a, 24b, and 24c are provided on the inside intermediate block 16B, and three sipes 24d, 24e, and 24f are provided on the inside shoulder block 16C.

In this description, the sipes are cuts formed on the blocks, which have a minute groove width. The groove width of the sipes is not particularly limited, and may be, for example, 0.1 to 1.5 mm, 0.2 to 1.0 mm or 0.3 to 0.8 mm. The sipes do not always have to be parallel to the tire width direction W as long as the sipes are narrow grooves extending in the tire width direction W and may be narrow grooves extending in the tire width direction W while being inclined. The sipes may be straight-line sipes, curved-line sipes, or sipes each having a bending portion.

As shown in FIG. 2 and FIG. 4, the three sipes 24a, 24b, and 24c provided on the inside intermediate block 16B extend while being inclined with respect to the tire width direction W and open to the inside shoulder main groove 12C.

Specifically, the sipe 24a is an acute-angle side sipe opening to the reinforcing protrusion 20. As shown in FIG. 3, a depth D1 of the inside intermediate block acute-angle side sipe 24a may be the same as, or may be shallower than the depth D0 of the inside shoulder main groove 12C. The depth D1 of the inside intermediate block acute-angle side sipe 24a may be constant in an extension direction thereof, or may vary in the extension direction. For example, the inside intermediate block acute-angle side sipe 24a may be formed to be shallow at an opening end part to the inside shoulder main groove 12C and may be formed to be deeper at the central part in the extension direction than at the opening end part.

A depth D11 at the opening end part may be shallower than a lower end position of the tread-surface side inclined surface 20a (an upper end position of the groove-bottom side inclined surface 20b), which may be, for example, 10% or more and 90% or less of the depth D0 of the inside shoulder main groove 12C. The inside intermediate block acute-angle side sipe 24a may open to the tread-surface side inclined surface 20a, not opening to the groove-bottom side inclined surface 20b.

Moreover, the depth D1 of the inside intermediate block acute-angle side sipe 24a at the central part in the extension direction may be deeper than the lower end position of the tread-surface side inclined surface 20a, which may be, for example, 50% or more and 90% or less of the depth D0 of the inside shoulder main groove 12C.

The sipe 24b is a sipe provided at the central part in the tire circumferential direction C of the inside intermediate block 16B, which corresponds to the intermediate sipe 24b opening to a boundary portion with respect to the reinforcing protrusion 20 protruding from the side wall 16B3 of the inside intermediate block 16B. In other words, the intermediate sipe 24b is disposed between the acute-angle side sipe 24a and the obtuse-angle side sipe 24c, which opens to a root portion of the reinforcing protrusion 20.

The sipe 24c is the inside intermediate block obtuse-angle side sipe 24c opening to the obtuse angle portion side in the side wall 16B3 of the inside intermediate block 16B (namely, a position facing the reinforcing protrusion 22 of the inside shoulder block 16C in the tire width direction W).

The inside intermediate block acute-angle side sipe 24a, the inside intermediate block intermediate sipe 24b, and the inside intermediate block obtuse-angle side sipe 24c are provided in parallel to the inside intermediate lateral groove 14C; however, these sipes can be grooves extending while being inclined with respect to the inside intermediate lateral groove 14C. The inside intermediate block acute-angle side sipe 24a and the inside intermediate block obtuse-angle side sipe 24c also open to the inside center main groove 12A and are provided so as to completely traverse the inside intermediate block 16B; however, these sipes do not always have to completely traverse the block. Moreover, the inside intermediate block intermediate sipe 24b do not have to completely traverse the inside intermediate block 16B as in the shown example, but can completely traverse the block.

As shown in FIG. 2, the three sipes 24d, 24e, and 24f provided on the inside shoulder block 16C extend while being inclined with respect to the tire width direction W and open to the inside shoulder main groove 12C.

Specifically, the sipe 24d is an inside shoulder block acute-angle side sipe opening to the reinforcing protrusion 22. The inside shoulder block acute-angle side sipe 24d may be provided on an extension of the inside intermediate block obtuse-angle side sipe 24c provided in the inside intermediate block 16B as shown in FIG. 2.

A depth D2 of the inside shoulder block acute-angle side sipe 24d may be the same as, or may be shallower than the depth D0 of the inside shoulder main groove 12C in the same matter as the inside intermediate block acute-angle side sipe 24a provided in the inside intermediate block 16B. The depth D2 of the inside shoulder block acute-angle side sipe 24d may be constant in an extension direction thereof, or may vary in the extension direction. For example, the inside shoulder block acute-angle side sipe 24d may be formed to be shallow at an opening end part to the inside shoulder main groove 12C and may be formed to be deeper at the central part in the extension direction than at the opening end part.

The depth D21 at the opening end part may be shallower than a lower end position of the tread-surface side inclined surface 22a (an upper end position of the groove-bottom side inclined surface 22b), which may be, for example, 10% or more and 90% or less of the depth D0 of the inside shoulder main groove 12C. The inside shoulder block acute-angle side sipe 24d may open to the tread-surface side inclined surface 22a, not opening to the groove-bottom side inclined surface 22b.

Moreover, the depth D2 of the inside shoulder block acute-angle side sipe 24d at the central part in the extension direction may be deeper than the lower end position of the tread-surface side inclined surface 22a, which may be, for example, 50% or more and 90% or less of the depth D0 of the inside shoulder main groove 12C.

The sipe 24e is a sipe provided at the central part in the tire circumferential direction C of the inside shoulder block 16C, which corresponds to the intermediate sipe 24e opening to a boundary portion with respect to the reinforcing protrusion 22 protruding from the side wall 16C3 of the inside shoulder block 16C. In other words, the intermediate sipe 24e is disposed between the inside shoulder block acute-angle side sipe 24d and the inside shoulder block obtuse-angle side sipe 24f, which opens to a root portion of the reinforcing protrusion 22. The intermediate sipe 24e may be provided on an extension of the intermediate sipe 24b provided in the inside intermediate block 16B as shown in FIG. 2.

The sipe 24f is the inside shoulder block obtuse-angle side sipe 24f opening to the obtuse angle portion side in the side wall 16C3 of the inside shoulder block 16C (namely, a position facing the reinforcing protrusion 20 of the inside intermediate block 16B in the tire width direction W). The inside shoulder block obtuse-angle side sipe 24f may be provided on an extension of the inside intermediate block acute-angle side sipe 24a provided in the inside intermediate block 16B as shown in FIG. 2.

The inside shoulder block acute-angle side sipe 24d, the inside shoulder block intermediate sipe 24e, and the inside shoulder block obtuse-angle side sipe 24f are provided in parallel to the inside shoulder lateral groove 14D; however, these sipes can be grooves extending while being inclined with respect to the inside shoulder lateral groove 14D.

(3) Center Block 16A and Outside Intermediate Block 16D

Next, the center block 16A and the outside intermediate block 16D will be explained. As shown in FIG. 1 and FIG. 5, a plurality of sipes extending while being inclined with respect to the tire width direction W and connecting portions connecting the sipes are provided respectively in the center block 16A and the outside intermediate block 16D.

Specifically, a first intermediate sipe 24g, a second intermediate sipe 24h, a third intermediate sipe 24i, a fourth intermediate sipe 24j, a first intermediate connecting portion 26a, and a second intermediate connecting portion 26b are provided in the outside intermediate block 16D.

As shown in FIG. 5, the first intermediate sipe 24g extends while being inclined in an opposite direction to the first outside intermediate lateral groove 14E with respect to the tire width direction W. In the first intermediate sipe 24g, one end 24g1 is connected to the first intermediate connecting portion 26a provided in the outside intermediate block 16D and the other end opens on a side wall 16D1 of the outside intermediate block 16D which faces the first outside intermediate lateral groove 14E.

The second intermediate sipe 24h extends while being inclined in an opposite direction to the second outside intermediate lateral groove 14F with respect to the tire width direction W. The second intermediate sipe 24h extends while being inclined in an opposite direction to the first intermediate sipe 24g with respect to the tire width direction W. One end 24h1 of the second intermediate sipe 24h is arranged at a position shifted from the one end 24g1 of the first intermediate sipe 24g in the tire circumferential direction C and connected to the first intermediate connecting portion 26a provided in the outside intermediate block 16D. The other end of the second intermediate sipe 24h opens on a side wall 16D2 of the outside intermediate block 16D which faces the second outside intermediate lateral groove 14F.

The third intermediate sipe 24i extends while being inclined in an opposite direction to the second outside intermediate lateral groove 14F with respect to the tire width direction W. One end 24i1 of the third intermediate sipe 24i is connected to the second intermediate connecting portion 26b provided in the outside intermediate block 16D. The other end of the third intermediate sipe 24i opens on a side wall 16D3 of the outside intermediate block 16D which faces the outside center main groove 12B. It is also preferable that, as shown in FIG. 7, the second outside intermediate lateral groove 14F is provided so as to pierce through the outside intermediate block 16D, and that the other end of the third intermediate sipe 24i opens on the side wall 16D2 of the outside intermediate block 16D which faces the second outside intermediate lateral groove 14F.

The fourth intermediate sipe 24j extends while being inclined in an opposite direction to the first outside intermediate lateral groove 14E with respect to the tire width direction W. That is, the fourth intermediate sipe 24j extends while being inclined in an opposite direction to the third intermediate sipe 24i with respect to the tire width direction W. One end 24j1 of the fourth intermediate sipe 24j is arranged at a position shifted from the one end 24i1 of the third intermediate sipe 24i in the tire circumferential direction C and connected to the second intermediate connecting portion 26b provided in the outside intermediate block 16D. The other end of the fourth intermediate sipe 24j opens on the side wall 16D1 of the outside intermediate block 16D which faces the first outside intermediate lateral groove 14E.

The first intermediate connecting portion 26a is formed by a recessed portion recessed from a tread surface of the outside intermediate block 16D, which has a trapezoidal shape in planar view as shown in FIG. 5. The first intermediate connecting portion 26a connects the one end 24g1 of the first intermediate sipe 24g and the one end 24h1 of the second intermediate sipe 24h which are arranged apart from each other in the tire circumferential direction C.

As shown in FIG. 6, a depth of the first intermediate connecting portion 26a is shallower than depths of the first intermediate sipe 24g and the second intermediate sipe 24h. For example, the depth of the first intermediate connecting portion 26a can be set to 1.0 to 4.0 mm. The first intermediate connecting portion 26a has an inclined bottom surface 26a1 which becomes deep as coming close to tip ends of the first intermediate sipe 24g and the second intermediate sipe 24h (as coming close to the inside in the tire width direction W).

The second intermediate connecting portion 26b is formed by a recessed portion recessed from the tread surface of the outside intermediate block 16D, which has a trapezoidal shape in planar view as shown in FIG. 5 in the same manner as the first intermediate connecting portion 26a. The second intermediate connecting portion 26b connects the one end 24i1 of the third intermediate sipe 24i and the one end 24j1 of the fourth intermediate sipe 24j which are arranged apart from each other in the tire circumferential direction C.

A depth of the second intermediate connecting portion 26b is shallower than depths of the third intermediate sipe 24i and the fourth intermediate sipe 24j. For example, the depth of the second intermediate connecting portion 26b can be set to 1.0 to 4.0 mm. The second intermediate connecting portion 26b has an inclined bottom surface 26b1 which becomes deep as coming close to tip ends of the third intermediate sipe 24i and the fourth intermediate sipe 24j (as coming close to the inside in the tire width direction W).

The first intermediate connecting portion 26a and the second intermediate connecting portion 26b described above are arranged to be shifted in the tire width direction W and are alternately arranged in the tire circumferential direction C.

Moreover, a first center sipe 24k, a second center sipe 24l, a third center sipe 24m, a fourth center sipe 24n, a first center connecting portion 28a, and a second center connecting portion 28b are provided in the center block 16A in the embodiment.

As shown in FIG. 5, the first center sipe 24k extends while being inclined in an opposite direction to the first center lateral groove 14A with respect to the tire width direction W. In the first center sipe 24k, one end 24k1 is connected to the first center connecting portion 28a provided in the center block 16A and the other end opens on a side wall 16A1 of the center block 16A which faces the outside center main groove 12B.

The first center sipe 24l extends while being inclined in an opposite direction to the second center lateral groove 14B with respect to the tire width direction W. The second center sipe 24l extends while being inclined in an opposite direction to the first center sipe 24k with respect to the tire width direction W. One end 24l1 of the second center sipe 24l is arranged at a position shifted from the one end 24k1 of the first center sipe 24k in the tire circumferential direction C and connected to the first center connecting portion 28a provided in the center block 16A. The other end of the second center sipe 24*l* opens on the side wall 16A1 of the center block 16A which faces the outside center main groove 12B.

The third center sipe 24*m* extends while being inclined in an opposite direction to the second center lateral groove 14B with respect to the tire width direction W. One end 24*m*1 of the third center sipe 24*m* is connected to the second center connecting portion 28*b* provided in the center block 16A. The other end of the third center sipe 24*m* opens on a side wall 16A2 of the center block 16A which faces the inside center main groove 12A.

The fourth center sipe 24*n* extends while being inclined in an opposite direction to the first center lateral groove 14A with respect to the tire width direction W. That is, the fourth center sipe 24*n* extends while being inclined in an opposite direction to the third center sipe 24*m* with respect to the tire width direction W. One end 24*n*1 of the fourth center sipe 24*n* is arranged at a position shifted from the one end 24*m*1 of the third center sipe 24*m* in the tire circumferential direction C and connected to the second center connecting portion 28*b* provided in the center block 16A. The other end of the fourth center sipe 24*n* opens on the side wall 16A2 of the center block 16A which faces the inside center main groove 12A.

The first center connecting portion 28*a* is formed by a recessed portion recessed from the tread surface of the center block 16A, which has a trapezoidal shape in planar view as shown in FIG. 5. The first center connecting portion 28*a* connects the one end 24*k*1 of the first center sipe 24*k* and the one end 24*l*1 of the second center sipe 24*l* which are arranged apart from each other in the tire circumferential direction C.

As shown in FIG. 6, a depth of the first center connecting portion 28*a* is shallower than depths of the first center sipe 24*k* and the second center sipe 24*l*. For example, the depth of the first center connecting portion 28*a* can be set to 1.0 to 4.0 mm. The first center connecting portion 28*a* has an inclined bottom surface 28*a*1 which becomes deep as coming close to tip ends of the first center sipe 24*k* and the second center sipe 24*l*.

A length of the first center connecting portion 28*a* along the tire circumferential direction C is longer than a length of the first intermediate connecting portion 26*a* provided in the outside intermediate block 16D along the tire circumferential direction C. For example, the length of the first intermediate connecting portion 26*a* along the tire circumferential direction C can be set to 1.0 to 5.0 mm, and the length of the first center connecting portion 28*a* along the tire circumferential direction C can be set to 5.0 to 10.0 mm. The first center connecting portion 28*a* is arranged so as to overlap at least part of the first intermediate connecting portion 26*a* in the tire width direction W.

The second center connecting portion 28*b* is formed by a recessed portion recessed from the tread surface of the center block 16A, which has a trapezoidal shape in planar view as shown in FIG. 5 in the same manner as the first center connecting portion 28*a*. The second center connecting portion 28*b* connects the one end 24*m*1 of the third center sipe 24*m* and the one end 24*n*1 of the fourth center sipe 24*n* which are arranged apart from each other in the tire circumferential direction C. A depth of the second center connecting portion 28*b* is shallower than depths of the third center sipe 24*m* and the fourth center sipe 24*n*. For example, the depth of the second center connecting portion 28*b* can be set to 1.0 to 4.0 mm. The second center connecting portion 28*b* has an inclined bottom surface 28*b*1 which becomes deep as coming close to tip ends of the third center sipe 24*m* and the fourth center sipe 24*n* (as coming close to the inside in the tire width direction W).

The second center connecting portion 28*b* is arranged so as to overlap at least part of the second intermediate connecting portion 26*b* in the tire width direction W.

In the embodiment, the first intermediate sipe 24*g* and the fourth intermediate sipe 24*j* are provided in parallel to the second outside intermediate lateral groove 14F, and the second intermediate sipe 24*h* and the third intermediate sipe 24*i* are provided in parallel to the first outside intermediate lateral groove 14E.

Moreover, the first center sipe 24*k* and the fourth center sipe 24*n* are arranged in parallel to the second center lateral groove 14B, and are arranged in parallel to the first intermediate sipe 24*g*, the fourth intermediate sipe 24*j*, and the second outside intermediate lateral groove 14F. The second center sipe 24*l* and the third center sipe 24*m* are arranged in parallel to the first center lateral groove 14A, and are arranged in parallel to the second intermediate sipe 24*h*, the third intermediate sipe 24*i*, and the first outside intermediate lateral groove 14E.

(4) Advantageous Effects

In the above-described pneumatic tire according to the embodiment, a pair of sipes connected by the connecting portion are provided in the outside intermediate block 16D or the center block 16A so as to be inclined in opposite directions to each other with respect to the tire width direction W; therefore, at least one of the pair of sipes makes a large angle which is almost perpendicular to a traveling direction of the vehicle at the time of turning of the vehicle when a large force acts. Accordingly, edge effect due to sipes can be maintained in the outside intermediate block 16D and the center block 16A not only during straight traveling but also at the time of turning of the vehicle.

Moreover, sipes inclined in opposite directions with respect to the tire width direction W are connected by the connecting portions 26*a*, 26*b*, 28*a*, and 28*b* formed by the recessed portion shallower than these sipes; therefore, distortion and heat generation occurring at ends of the sipes can be reduced to thereby improve durability performance, and reduction of rigidity in the outside intermediate blocks 16D and the center blocks 16A can be suppressed to thereby suppress uneven wear.

Since the connecting portions 26*a*, 26*b*, 28*a*, and 28*b* have the inclined bottom surfaces 26*a*1, 26*b*1, 28*a*1, and 28*b*1 which become deep as coming close to the tip ends of the sipes in the embodiment, distortion and heat generation occurring at ends of the sipes can be efficiently suppressed.

In the embodiment, the first intermediate sipe 24*g* extends while being inclined in the opposite direction to the first outside intermediate lateral groove 14E with respect to the tire width direction W and opens on the side wall 16D1 of the outside intermediate block 16D which faces the first outside intermediate lateral groove 14E. Moreover, the second intermediate sipe 24*h* extends while being inclined in the opposite direction to the second outside intermediate lateral groove 14F with respect to the tire width direction W and opens on the side wall 16D2 of the outside intermediate block 16D which faces the second outside intermediate lateral groove 14F; therefore, the rigidity of the blocks at the time of turning of the vehicle can be secured and uneven wear can be suppressed.

In particular, the first intermediate sipe 24*g* is provided in parallel to the second outside intermediate lateral groove 14F, and the second intermediate sipe 24*h* is provided in parallel to the first outside intermediate lateral groove 14E in the embodiment. Accordingly, when a force in which the outside intermediate block 16D leans against the first outside intermediate lateral groove 14E or the second outside intermediate lateral groove 14F acts, groove widths of the second intermediate sipe 24h and the first intermediate sipe 24g which are provided in parallel to the grooves are expanded to make the edge effect easy to produce, which can improve performance on a slippery road surface such as an icy and snowy road.

Although a large force tends to act on an outside area of the vehicle outside OUT on an outer side than the tire equatorial plane CL at the time of turning of the vehicle in the vehicle mounted posture, the first intermediate sipe 24g, the second intermediate sipe 24h, the third intermediate sipe 24i, the fourth intermediate sipe 24j, the first intermediate connecting portion 26a, and the second intermediate connecting portion 26b described above are provided on the outside area in the embodiment; therefore, the outside intermediate block 16D does not easily lean against the groove to thereby suppress uneven wear.

Moreover, the sipes 24a, 24b, 24c, 24d, 24e, and 24f which are parallel to the inside intermediate lateral groove 14C or the inside shoulder lateral groove 14D are provided on the inside intermediate blocks 16B and the inside shoulder blocks 16C positioned in the area of the vehicle inside IN on the inner side of the tire equatorial plane CL in the vehicle mounted posture; therefore, the groove widths of the sipes are easily expanded at the time of contacting the ground to thereby exert high edge effect.

The present invention is not at all limited by the above embodiment, and various modifications and alterations may occur within a scope not departing from the gist of the invention.

REFERENCE SIGNS LIST

10: tread
12A: inside center main groove
12B: outside center main groove
12C: inside shoulder main groove
12C1: groove bottom
12D: outside shoulder main groove
14A: first center lateral groove
14B: second center lateral groove
14C: inside intermediate lateral groove
14D: inside shoulder lateral groove
14E: first outside intermediate lateral groove
14F: second outside intermediate lateral groove
14G: first outside shoulder lateral groove
14H: second outside shoulder lateral groove
16A: center block
16B: inside intermediate block
16B1: acute angle portion
16B2: obtuse angle portion
16B3: side wall
16B4: tread surface
16C: inside shoulder block
16C1: acute angle portion
16C2: obtuse angle portion
16C3: side wall
16D: outside intermediate block
16E: outside shoulder block
18A: center block line
18B: inside intermediate block line
18C: inside shoulder block line
18D: outside intermediate block line
18E: outside shoulder block line
20: reinforcing protrusion
20a: tread-surface side inclined surface
20b: groove-bottom side inclined surface
22: reinforcing protrusion
22a: tread-surface side inclined surface
22b: groove-bottom side inclined surface
24a: inside intermediate block acute-angle side sipe
24b: inside intermediate block intermediate sipe
24c: inside intermediate block obtuse-angle side sipe
24d: inside shoulder block acute-angle side sipe
24e: inside shoulder block intermediate sipe
24f: inside shoulder block obtuse-angle side sipe
24g: first intermediate sipe
24h: second intermediate sipe
24i: third intermediate sipe
24j: fourth intermediate sipe
24k: first center sipe
24l: second center sipe
24m: third center sipe
24n: fourth center sipe
26a: first intermediate connecting portion
26b: second intermediate connecting portion
28a: first center connecting portion
28a1: inclined bottom surface
28b: second center connecting portion
28b1: inclined bottom surface

What is claimed is:

1. A pneumatic tire comprising:
a plurality of main grooves extending parallel to a tire circumferential direction; a plurality of lateral grooves provided at intervals in the tire circumferential direction; and
a first block line in which a plurality of first blocks sectioned by the main grooves and the lateral grooves are arranged in the tire circumferential direction on a tread, wherein the plurality of lateral grooves include first lateral grooves extending while being inclined with respect to a tire width direction and second lateral grooves inclined in an opposite direction to the first lateral grooves with respect to the tire width direction, and the first lateral grooves and the second lateral grooves are alternately arranged,
each of the first blocks has a first sipe extending while being inclined with respect to the tire width direction, a second sipe inclined in an opposite direction to the first sipe with respect to the tire width direction, and a first connecting portion connecting ends of the first sipe and the second sipe,
the first connecting portion is formed by a recessed portion shallower than the first sipe and the second sipe, and
the first connecting portion connects one end of the first sipe and one end of the second sipe which are arranged apart from each other in the tire circumferential direction.

2. The pneumatic tire according to claim 1, wherein the first connecting portion has an inclined surface which becomes deep as coming close to tip ends of the first sipe and the second sipe.

3. The pneumatic tire according to claim 1, wherein the first sipe extends from the first connecting portion while being inclined with respect to the first lateral groove and opens on a side wall of the first block which faces the first lateral groove, and
the second sipe extends from the first connecting portion while being inclined with respect to the second lateral groove and opens on a side wall of the first block which faces the second lateral groove.

4. The pneumatic tire according to claim 1,
wherein a mounting direction to a vehicle is designated in the tire, and
the first block line is provided on an outside area positioned on an outer side when mounted to the vehicle than the tire equatorial plane on the tread.

5. A pneumatic tire, comprising:
a plurality of main grooves extending in a tire circumferential direction;
a plurality of lateral grooves provided at intervals in the tire circumferential direction; and
a first block line in which a plurality of first blocks sectioned by the main grooves and the lateral grooves are arranged in the tire circumferential direction on a tread, wherein the plurality of lateral grooves include first lateral grooves extending while being inclined with respect to a tire width direction and second lateral grooves inclined in an opposite direction to the first lateral grooves with respect to the tire width direction, and the first lateral grooves and the second lateral grooves are alternately arranged,
each of the first blocks has a first sipe extending while being inclined with respect to the tire width direction, a second sipe inclined in an opposite direction to the first sipe with respect to the tire width direction, and a first connecting portion connecting ends of the first sipe and the second sipe, and
the first connecting portion is formed by a recessed portion shallower than the first sipe and the second sipe,
wherein the first sipe extends from the first connecting portion while being inclined with respect to the first lateral groove and opens on a side wall of the first block which faces the first lateral groove, and
the second sipe extends from the first connecting portion while being inclined with respect to the second lateral groove and opens on a side wall of the first block which faces the second lateral groove, and
wherein the first sipe extends in parallel to the second lateral groove, and the second sipe is provided in parallel to the first lateral groove.

6. A pneumatic tire, comprising:
a plurality of main grooves extending in a tire circumferential direction;
a plurality of lateral grooves provided at intervals in the tire circumferential direction; and
a first block line in which a plurality of first blocks sectioned by the main grooves and the lateral grooves are arranged in the tire circumferential direction on a tread, wherein the plurality of lateral grooves include first lateral grooves extending while being inclined with respect to a tire width direction and second lateral grooves inclined in an opposite direction to the first lateral grooves with respect to the tire width direction, and the first lateral grooves and the second lateral grooves are alternately arranged,
each of the first blocks has a first sipe extending while being inclined with respect to the tire width direction, a second sipe inclined in an opposite direction to the first sipe with respect to the tire width direction, and a first connecting portion connecting ends of the first sipe and the second sipe, and
the first connecting portion is formed by a recessed portion shallower than the first sipe and the second sipe,
wherein the plurality of main grooves include a pair of center main grooves and a pair of shoulder main grooves arranged on outer sides in the tire width direction of the pair of center main grooves,
an intermediate block line in which a plurality of intermediate blocks are arranged in the tire circumferential direction is provided between the center main groove and the shoulder main groove,
each of the intermediate blocks has the first sipe, the second sipe, and the first connecting portion,
a center block line in which a plurality of center blocks are arranged in the tire circumferential direction is provided between the pair of center main grooves,
each of the center blocks has a first center sipe and a second sipe inclined in opposite directions to each other with respect to the tire width direction, and a center connecting portion connecting ends of the first center sipe and the second center sipe, and
the center connecting portion has a recessed shape shallower than the first center sipe and the second center sipe, a length of which along the tire circumferential direction is longer than the first connecting portion provided in the intermediate block.

* * * * *